United States Patent [19]

Staff et al.

[11] 4,058,633

[45] Nov. 15, 1977

[54] MEAT PRODUCT, AND PROCESS FOR PREPARING SAME

[75] Inventors: Charles H. Staff, Omaha, Nebr.; Gale F. Kunert, San Ramon, Calif.; Tom A. Christians, Council Bluffs, Iowa

[73] Assignee: Fairmont Foods Company, Omaha, Nebr.

[21] Appl. No.: 723,627

[22] Filed: Sept. 15, 1976

[51] Int. Cl.² .................... A22C 11/00; A23B 4/04
[52] U.S. Cl. ............................... 426/315; 426/444; 426/513; 426/646
[58] Field of Search ............... 426/315, 513, 524, 444, 426/135, 393, 414, 105, 385, 642, 646, 652, 282, 284, 129, 92, 104

[56] References Cited

U.S. PATENT DOCUMENTS

| | | |
|---|---|---|
| 1,009,951 | 11/1911 | Armstrong |
| 1,964,009 | 6/1934 | Vogt |
| 1,964,010 | 6/1934 | Vogt |
| 1,964,011 | 6/1934 | Vogt |
| 2,182,211 | 12/1939 | Paddock |
| 2,713,003 | 7/1955 | Rivoche ............................ 426/524 |
| 3,063,842 | 11/1962 | Podebradsky .................. 426/513 X |
| 3,092,499 | 6/1963 | Gretler et al. |
| 3,113,870 | 12/1963 | Barnett et al. .................... 426/315 |
| 3,124,462 | 3/1964 | Vogel et al. ..................... 426/393 X |
| 3,132,031 | 5/1964 | Rarick et al. |
| 3,201,264 | 8/1965 | Rasmussen et al. ............ 426/315 X |
| 3,306,754 | 2/1967 | Kielsmeier et al. |
| 3,482,996 | 12/1969 | Christianson et al. ......... 426/646 X |
| 3,634,102 | 1/1972 | Raynter et al. |
| 3,894,162 | 7/1975 | Jones et al. ..................... 426/513 X |
| 3,903,313 | 9/1975 | Maher et al. ................... 426/315 X |

FOREIGN PATENT DOCUMENTS

| | | |
|---|---|---|
| 122,397 | 1/1954 | U.S.S.R. ............................. 426/315 |

OTHER PUBLICATIONS

Arsdel, Food Dehydration, vol. 2, ed. 2, 1973, The Avi Pub. Co., Inc., Westport Conn., pp. 246, 247.
Tressler, The Freezing Preservation of Foods, vol. 2, ed. 4, 1968, The Avi Pub. Co., Inc., Westport Conn., p. 145.

Primary Examiner—S. Leon Bashore
Assistant Examiner—Kenneth M. Schor
Attorney, Agent, or Firm—Henry L. Brinks

[57] ABSTRACT

A method for manufacturing a dried or semi-dried meat product, such as casingless sausage, especially such a sausage popularly known as "meat sticks," though not limited thereto. A pre-formed meat emulsion with a moisture content in excess of 30% by weight, and a fat content in the range from about 5% to 50% by weight, is formed into the desired cross sectional shape and then frozen; thereafter, the sausage is optionally smoked, but, whether smoked or not, it is then dried at temperatures in excess of about 40° F until the moisture content is in the range from about 10% to 30% by weight.

16 Claims, 1 Drawing Figure

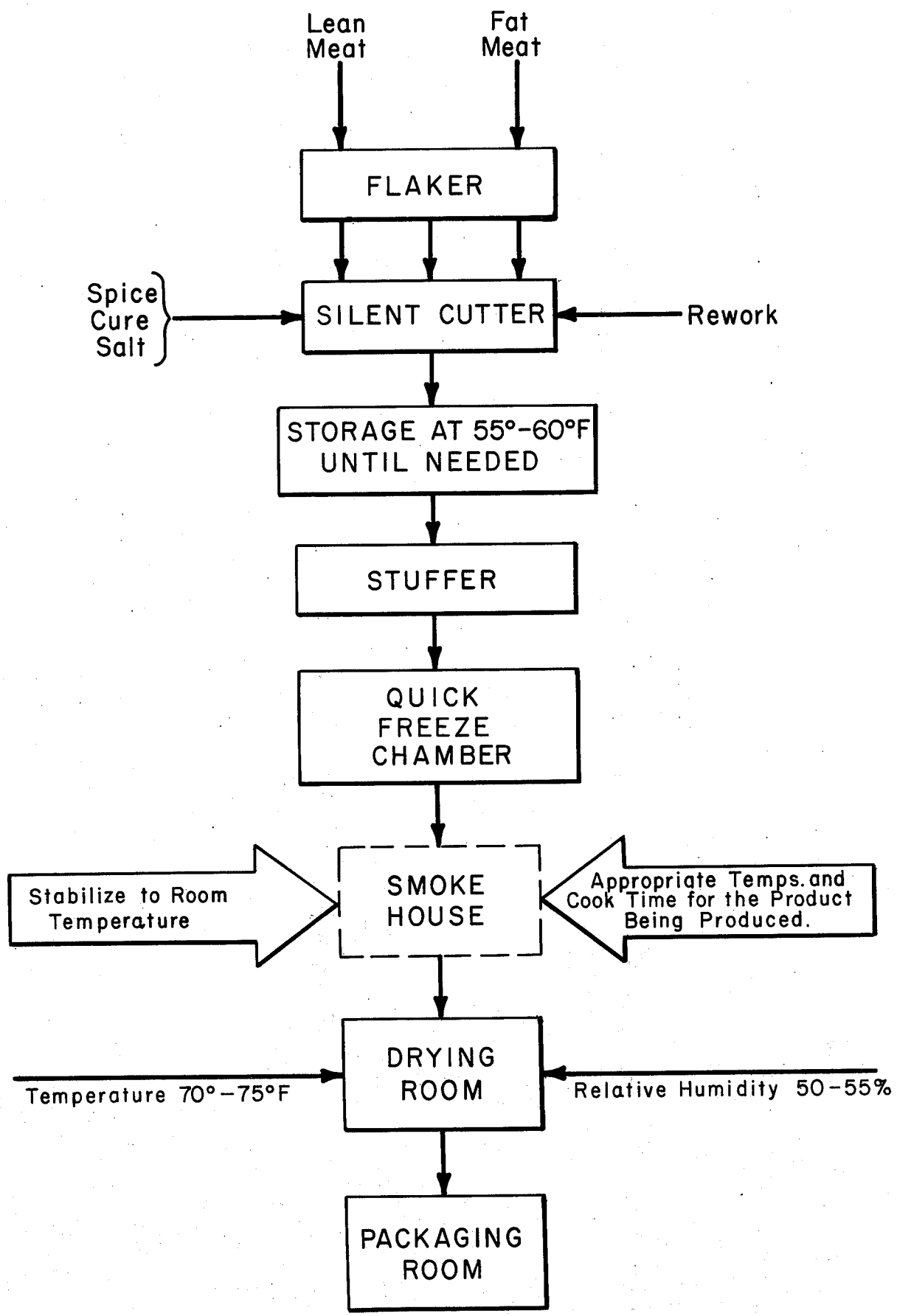

MEAT PRODUCT, AND PROCESS FOR PREPARING SAME

This invention relates as indicated to dried and semi-dried meat products, such as casingless sausages, especially dried sausages popularly known as "meat sticks," and the process for producing the same.

BACKGROUND OF THE INVENTION

Casingless sausages became known as a substitute for those stuffed into animal-derived casings on the commercial market some years ago. An early example of an effort to supplant animal casings is discussed in the United States Pat. No. 1,009,953, to Boyle, in which sausage meat was placed in a mold that was then submerged in a hot water bath to cook the surface of the meat in contact with the mold so as to produce a thin crust thereon composed of the same meat mixture as the body of the sausages. The imperfections of this method, and ways to improve upon it, are the subject of the Vogt U.S. Pat. No. 1,964,009-011, issued some years later, in 1934. Vogt teaches the production of casingless sausage having an integral protective skin formed of a substantial percentage of nitrogenous or protein matter, that resembles animal-intestine encased sausages, having greater tensile strength than that of a cooked crust of the sausage meat of comparable thickness as taught by Boyle. Vogt's sausage is subjected to a temperature of 120° F or less to form a tender skin that is thereafter toughened by increasing the heat to about 170° F. The United States patent to Paddock U.S. Pat. No. 2,182,211, prepares a casingless sausage by extruding sausage meat through a heat extrusion die. Podebradsky, U.S. Pat. No. 3,063,842, first shapes sausage meat, then freezes the surface of it, then gives a final shaping and compaction, optionally followed by a momentary treatment with a hot compatible liquid.

These and other methods are representative of the art underlying current commercial practices, to the improvement of which the present invention is directed. Significant problems remain unredressed in the prior art at which this invention is aimed:

1. Casingless sausages after packaging have been known to exude fatty oil through their integuments, which is an undesirable property referred to as "oiling off" in the industry.
2. Casingless sausages of the dry-sausage type have been prone to develop blooms of white matter resembling mold, now known to be salt, which greatly impair the salability of the product. This undesirable property is referred to as "salting out" in the industry.
3. Edible casings represent approximately 25% of the cost of the sausage product, and realizing lower costs without sacrificing quality is imperative.

Sausage, whether stuffed into casings, or casingless, contains large amounts of fat, usually in the range of 20%-50%. Oiling-off of the sausage is a problem in both casing and casingless sausage.

SUMMARY OF THE OBJECTIVES OF THE INVENTION

Accordingly, it is an object of the invention to provide dried and semi-dried meat products, for example, casingless sausages, in which the tendency of the product to oil-off after packaging is substantially reduced or eliminated, and to provide processes for producing such products.

It is another object of the invention to provide a novel method for manufacturing casingless sausages in which salting-out of the finished product is prevented throughout its shelf life.

A further object contemplates reducing the cost of sausage production by the elimination of the casings presently used that contribute significantly to the costs of producing dry sausage.

It is yet another objective of the invention to reduce the tendency of semi-dry and dry sausages produced with a casing to oil-off.

It is still a further object to meet the foregoing objectives with the production of a product that has an increased consumer acceptance over the product presently on the market.

It is still a further objective to allow for increased fat levels in the meat products, thus reducing costs without the undesirable oiling-off.

Further objects and advantages will be apparent from the following description.

DESCRIPTION OF THE DRAWING

The accompanying drawing is a product flow diagram of a preferred sequence of steps for carrying out the process of the present invention, wherein optional and dispensable steps are framed in broken lines. The steps framed in solid lines are necessary to give effect to the invention, either as described hereinafter, or through reasonable equivalencies therefor, as will be apparent to those skilled in the art.

DESCRIPTION OF THE PREFERRED EMBODIMENT

A suitable chopped meat product emulsion is prepared from meat trimmings and seasonings. The emulsion contains moisture in excess of about 30% by weight and fat in the range from about 5% to 50% by weight.

This meat emulsion is prepared in a well known manner from meat portions, which have been previously flaked into flat slices, rework, which includes cuttings and misshaped pieces from previous batches, and seasoning. The rework and lean meat portions are placed in a silent cutter and the mixture is chopped. During this chopping the salt, spice and cure are added in that order. Finally the fat meat portions are added and the emulsion is chopped until the desired consistency is obtained.

The chopped meat emulsion is then put in holding tubs and stored until needed. Thereafter, the meat is delivered to a sausage stuffer from which it is extruded in sausage-form through a row of stuffing horns of proper diameter onto a conveyor belt as it passes beneath the stuffing horns. The conveyor belt carries the freshly extruded meat emulsion into a nitrogen tunnel where it is quick-frozen.

The nitrogen tunnel is a device well known in the meat processing art. It consists essentially of an enclosed volume into which liquid nitrogen is introduced at a controlled rate. The liquid nitrogen serves to cool the interior of the nitrogen tunnel and to quick freeze objects placed in the tunnel.

The nitrogen tunnel used for freezing the meat emulsion is controlled so as to maintain an air temperature of −100° F to −150° F within the tunnel. The meat emulsion is allowed to remain in the nitrogen tunnel for a period of time which varies with the dimensions of the extruded emulsion. Cooling times in the range of thirty seconds to ten minutes have been found suitable. Empirical test data show that the preferred cooling time for a 0.6 inch diameter meat extrusion is in the range of one to three minutes while the preferred cooling time for a 1 inch diameter meat extrusion is in the range of three to five minutes.

After the meat extrusion has been sufficiently cooled it is removed from the nitrogen tunnel and cut to the desired length. It is then permitted to stabilize at room temperature and given sufficient time for the cure to develop.

If cooking is contemplated, this stabilization may take place in the smokehouse before the cooling operation has started. When ready, the cooking may commence at a temperature and humidity appropriate for the product being cooked.

Whether cooked as in the preceding step or not, the sausages are then removed to a drying room with a temperature and humidity appropriate for the dried or semi-dried meat product being produced until a moisture content suitable for packaging has been achieved. In the case of the dry sausage sticks, it has been found that a moisture content lower than about 14% should be reached to prevent salting-out during the shelf lift of the sticks, as previously discussed.

After drying, the sausages are then packaged according to conventional practices.

In order to further illustrate the invention, the following examples are presented which should be considered as exemplifications of the invention and not as limitations thereof.

EXAMPLE NO. 1
(Casingless Sausage)

| Ingredients: | Amount: | lbs. | oz. |
|---|---|---|---|
| Lean | | 90 | 0 |
| Cheek | | 20 | 0 |
| Navels | | 200 | 0 |
| Water | | 15 | 0 |
| Dextrose | | 3 | 6 |
| Red Pepper | | 1 | 0 |
| Black Pepper | | 0 | 13.6 |
| Salt | | 6 | 5 |
| Paprika | | 0 | 9.5 |
| Garlic | | 1 | 0 |
| Cure | | 0 | 9.5 |
| Sodium Erythorbate | | 0 | .32 |
| Rework | | 20 | 0 |

The frozen meat is prebroken in, for example, a hydrauflaker, then weighed into tubs. The lean meat portion along with the spices, salt, and cure, are put in a silent cutter and chopped. The fat portion of the meat formula is then added and chopped for 7-10 more revolutions. This meat is then held in tubs at a room temperature of 55°-60° F until needed. The meat is then extruded through an extruder, such as the vacuum stuffer made by Vemag. Each sausage is extruded in a size of about 0.6 inch diameter onto a conveyor belt which carries the extruded meat into a nitrogen tunnel which is used to quick freeze the meat at an air temperature of approximately −100° F to −150° F. The meat emulsion is allowed to remain in the nitrogen tunnel for a preferred cooling time of one to three minutes. Then the meat emulsion is removed, cut to length and allowed to stabilize at room temperature while the cure develops.

After the cure has developed the meat emulsion is placed in a smokehouse where it is cooked for 5 hours at 148° F dry bulb and 126° F wet bulb with continuous smoke. The cooked sausage is then transferred to a drying room at 75° F and 50°-55° relative humidity until a moisture of 14% is reached. The sausage is then packaged. The fat content of the final product is approximately 45% by weight.

EXAMPLE NO. 2
(Thuringer Like Sausage Made Without A Casing)

| Ingredients: | Amount: | lbs. | oz. |
|---|---|---|---|
| Pork trim (75% lean) | | 55 | 0 |
| Whole carcass beef | | 45 | 0 |
| Salt | | 2 | 8 |
| Dextrose | | 1 | 0 |
| Ground black pepper | | 0 | 4 |
| Starter culture | | 0 | 2 |
| Whole mustard seed | | 0 | 2 |
| Corriander | | 0 | 1 |
| Sodium nitrate | | 0 | 0.25 |
| Sodium nitrite | | 0 | 0.125 |

The process follows the procedure described in Example No. 1 except that the product is cooked in the smokehouse for one hour at 110° F, then for another four hours at 140° F or until an internal temperature of 137° F is reached.

EXAMPLE NO. 3
(Lebanon Bologna Like Sausage Made Without A Casing)

| Ingredients: | Amount: | lbs. | oz. |
|---|---|---|---|
| Whole carcass cow meat | | 100 | 0 |
| Salt | | 1 | 8 |
| Sugar | | 1 | 0 |
| Mustard | | 0 | 8 |
| White Pepper | | 0 | 2 |
| Ginger | | 0 | 1 |
| Mace | | 0 | 1 |
| Sodium nitrate | | 0 | 1 |

The process follows the procedure set forth in Example No. 1.

EXAMPLE NO. 4
(Pepperoni Like Sausage Made Without A Casing)

| Ingredients: | Amount: | lbs. | oz. |
|---|---|---|---|
| Pork trimmings | | 45 | 0 |
| Beef chucks | | 30 | 0 |
| Pork hearts | | 15 | 0 |
| Pork cheeks | | 10 | 0 |
| Salt | | 3 | 8 |
| Sugar | | 1 | 0 |
| Sweet peprika | | 0 | 12 |
| Ground Pepper | | 0 | 6 |
| Capsaican | | 0 | 4 |
| Whole fennel seed | | 0 | 4 |
| Sodium nitrate | | 0 | 1 |

The process follows the procedure set forth in Example No. 1 except that the product is cooked in the smokehouse for one hour at 110° F, then for another four hours at 140° F or until an internal temperature of 137° F is reached.

EXAMPLE NO. 5
(Pepperoni Made With A Casing)

| Ingredients: | Amount: | lbs. | oz. |
|---|---|---|---|
| Pork trimmings | | 45 | 0 |
| Beef chucks | | 30 | 0 |
| Pork hearts | | 15 | 0 |
| Pork cheeks | | 10 | 0 |
| Salt | | 3 | 8 |
| Sugar | | 1 | 0 |
| Sweet paprika | | 0 | 12 |
| Ground pepper | | 0 | 6 |
| Capsaican | | 0 | 4 |

-continued

EXAMPLE NO. 5
(Pepperoni Made With A Casing)

| Ingredients: | Amount: | lbs. | oz. |
|---|---|---|---|
| Whole fennel seed | | 0 | 4 |
| Sodium nitrate | | 0 | 1 |

The process follows the procedure of Example 1 except that rather then extruding the sausage emulsion, the emulsion meat is stuffed into 13-16 mm. fibrous casings. The sausages are then placed in a nitrogen tunnel which maintains an internal air temperature in the approximate range of −100° F to −150° F for a preferred cooling time of one to three minutes. The product is then removed from the nitrogen tunnel and allowed to stabilize at room temperature. It is then cooked for one hour at 110° F and for four hours at 140° F or until an internal temperature of 137° F is reached. The product is then dried according to conventional practices with pepperoni.

Significant benefits are realized from the present invention by the step of quick freezing the sausage which reduces the oiling-off tendency in the product after packaging. In the case of dried sausage, drying to a moisture content of 14% or less before packaging avoids salting-out during the shelf life of the product.

The sausages made according to this method have the finished appearance of sausages stuffed into animal-derived casings, without the considerable expense of the latter and the often tough and unassimilable nature thereof when consumed. Such casings represent about 25% of the cost of the product, and their elimination represents a significant contribution toward cost savings, without detriment to the quality of the products or its consumer acceptance. Preliminary taste panels have indicated a preference for the casingless sausage, which should reflect increased consumer acceptance.

Moreover, the products produced by the process disclosed herein are shelf stable and do not require any refrigeration after their manufacture. Since they are dried to less than 15% moisture no growth of any micro-organisms can occur. Therefore, they can be packaged, shipped and sold in the stores without any refrigeration.

The embodiments of the invention herein disclosed are presented by way of example. The scope of the invention is not intended to be limited thereby, but rather it is intended that the appended claims be construed as broadly as is warranted by the prior art.

We claim:

1. The method for manufacturing a casingless dried meat product that includes the following steps in the specified order:
   a. preparing a meat emulsion having a moisture content exceeding 30% by weight;
   b. forming said meat emulsion into the desired cross sectional shape;
   c. freezing at least the surface of said meat emulsion;
   d. allowing said meat emulsion to become stabilized at room temperature; and
   e. drying said formed meat emulsion at temperatures above 40° F. until its moisture content is reduced to the range of from about 10% to 15% by weight to prepare a finished dried meat product with a reduced tendency to oil-off and salt-out.

2. The method of claim 1 wherein said freezing is accomplished by exposing said extruded meat to a cooling temperature of −100° F to −150° F for a cooling time of thirty seconds to ten minutes.

3. The method of claim 2 wherein said meat emulsion is formed into a circular cross sectional shape having a diameter of about 1 inch and said cooling time is within the range of three to five minutes.

4. The method of claim 2 wherein said meat emulsion is formed into a circular cross sectional shape having a diameter of about 0.6 inch and said cooling time is within the range of one to three minutes.

5. The method of claim 1 which includes the further step, immediately following its stabilization at room temperature, of:
   cooking said formed meat emulsion at a appropriate dry bulb and wet bulb setting for a sufficient period of time to cook the meat product while continuously exposing said emulsion to smoke.

6. The method of manufacturing a casingless dried meat product, and which is adapted to prepare a casingless dry sausage, that includes the following steps in the specified order:
   a. preparing a meat emulsion having a moisture content exceeding 30% by weight;
   b. forming said emulsion into a desired sausage cross sectional shape;
   c. freezing said meat emulsion;
   d. allowing said meat emulsion to stabilize at room temperature; and
   e. drying said meat emulsion in an atmosphere with temperatures above 40° F. and a relative humidity below 60% until its moisture content is about 14% by weight, to prepare a finished casingless dried meat product with a reduced tendency to oil-off and salt-out.

7. The method of claim 6, wherein, between the steps (d) and (e), the sausages are exposed to an additional step of:
   cooking said meat emulsion for approximately four hours in the presence of smoke.

8. The method of manufacturing a dried casingless sausage that includes the steps of:
   a. preparing a meat emulsion having a moisture content exceeding about 30% by weight;
   b. forming the meat emulsion into a sausage cross sectional shape by extrusion through a row of stuffing horns;
   c. exposing the formed meat emulsion to a cooling temperature of −100° F. to −150° F. for a cooling time of thirty seconds to ten minutes;
   d. allowing the frozen meat emulsion to stabilize at room temperature;
   e. cooking the stabilized meat emulsion for approximately four hours in the presence of smoke, and thereafter
   f. drying the cooked meat emulsion at a temperature of about 70° F.−75° F. and a relative humidity of about 50–75%, until its moisture content is at most approximately 15%.

9. The casingless dried meat product according to the process of claim 1.

10. The casingless dried meat product prepared according to the process of claim 2.

11. The casingless dried meat product prepared according to the process of claim 3.

12. The casingless dried meat product prepared according to the process of claim 4.

13. The casingless dried meat product prepared according to the process of claim 5.

14. The casingless dried meat product prepared according to the process of claim 6.

15. The casingless dried meat product prepared according to the process of claim 7.

16. The dried casingless sausage prepared according to the process of claim 8.

* * * * *

UNITED STATES PATENT AND TRADEMARK OFFICE
CERTIFICATE OF CORRECTION

PATENT NO. : 4,058,633
DATED : November 15, 1977
INVENTOR(S) : Charles H. Staff, Gale F. Kunert, Tom A. Christians It is certified that error appears in the above-identified patent and that said Letters Patent are hereby corrected as shown below:

Column 3, line 12, "cooling" should be -- cooking --

Column 3, line 23, "lift" should be -- life --

Signed and Sealed this

Twentieth Day of June 1978

[SEAL]

Attest:

RUTH C. MASON
Attesting Officer

DONALD W. BANNER
Commissioner of Patents and Trademarks